United States Patent [19]
Frankenhauser

[11] 3,921,018
[45] Nov. 18, 1975

[54] APPARATUS FOR COOLING ARMATURE END TURNS

[75] Inventor: Georg Frankenhauser, Mulheim (Ruhr), Germany

[73] Assignee: Kraftwerk Union Aktiengesellschaft, Mulheim (Ruhr), Germany

[22] Filed: Mar. 14, 1974

[21] Appl. No.: 451,188

Related U.S. Application Data
[63] Continuation of Ser. No. 307,991, Nov. 20, 1972, abandoned.

[30] Foreign Application Priority Data
Nov. 20, 1971 Germany............................ 2157715

[52] U.S. Cl. .................... 310/270; 310/59; 310/62
[51] Int. Cl.² ...................... H02K 3/46; H02K 9/00
[58] Field of Search ............ 310/52, 53, 58, 59, 60, 310/63, 64, 65, 61, 62, 260, 270, 271

[56] References Cited
UNITED STATES PATENTS

| | | | |
|---|---|---|---|
| 1,920,315 | 8/1933 | Myers | 310/63 |
| 2,482,527 | 9/1949 | Weil | 310/270 |
| 2,519,219 | 8/1950 | Baudry | 310/270 |
| 2,970,234 | 1/1961 | Erickson | 310/61 |
| 2,998,537 | 8/1961 | Zeissler | 310/270 |
| 3,330,978 | 7/1967 | Pettit | 310/271 |
| 3,365,600 | 1/1968 | Penn | 310/270 |
| 3,454,805 | 7/1969 | Fromm | 310/260 |
| 3,461,331 | 8/1969 | Pannell | 310/61 |
| 3,502,916 | 3/1970 | Stavrache | 310/59 |
| 3,517,232 | 6/1970 | Sano | 310/61 |

Primary Examiner—R. Skudy
Attorney, Agent, or Firm—Herbert L. Lerner

[57] ABSTRACT

Device for cooling overhead turns of the armature of a polyphase a-c main exciter machine wherein the armature has a laminated core includes a plurality of coil rods extending from opposite sides of the armature laminated core, respective pairs of the rods being disposed close to one another in the region of the overhang turns, the coil rods of the respective pairs thereof being mutually spaced at substantially uniform lateral distance, adjacent pairs of the closely disposed coil rods defining cooling channels therebetween, and blower means for passing cooling air through the cooling channels on both the opposite sides of the armature.

1 Claim, 2 Drawing Figures

APPARATUS FOR COOLING ARMATURE END TURNS

This is a continuation of application Ser. No. 307,991, filed Nov. 20, 1972, now abandoned.

The invention relates to a device for cooling the overhang or end turns of the armature of polyphase a-c main exciter machines.

As the power output of turbogenerators increases, a correspondingly greater output of the exciter current source is required. The voltage limitation in the rotor circuit calls for higher currents in the coil rods of the polyphase a-c armature of the main exciter machines because, for increasing the power output, the outer diameter of the polyphase a-c armature cannot be arbitrarily increased in light of centrifugal forces. To reduce the skin effect current losses in the slot vicinity of the polyphase a-c armature, the use of Roebel or transposed rods or bars has been made necessary. With the conventional frame sizes employed heretofore, the current-produced heat in the rods in the region of the overhang turns has been safely removed through the relatively thin wire banding and through cooling fins located at the ends of the turns. The coil side of the rods were maintained at uniform spacing at the periphery by means of insulating shims or wedges.

The insulating currents and the heat losses which increase with the square of the current require, however, additional measures for cooling the overhang or end turns. These measures are also required if, instead of the usual relatively thin wire banding or tape non-metallic glass banding is applied, because heat can then no longer flow out of the latter banding adequately due to the relatively low thermal conductivity of such banding.

It is accordingly an object of the invention to provide a device for cooling the overhang or end turns of the armature of polyphase a-c main exciter machines reliably at relatively low cost.

With the foregoing and other objects in view, there is provided in accordance with the invention device for cooling overhang turns of the armature of a polyphase a-c main exciter machine wherein the armature has a laminated core, comprising a plurality of coil rods extending from opposite sides of the armature laminated core, respective pairs of the rods being disposed close to one another in the region of the overhang turns, the coil rods of the respective pairs thereof being mutually spaced at substantially uniform lateral distance, adjacent pairs of the closely disposed coil rods defining cooling channels therebetween, and blower means for passing cooling air through the cooling channels on both the opposite sides of the armature.

By moving the respective rods of the pairs thereof toward one another, intermediate spaces free of spacer members are formed in the region of the overhang or end turns, those intermediate spaces serving as cooling channels and thereby assuring reliable cooling of the coils.

In accordance with other features of the invention, the blower means comprises either one blower located on one side of the armature, or two blowers located respectively on opposite sides of the armature.

In accordance with a further feature of the invention, the main exciter machine has exciter poles and is enclosed by a machine housing, the device including separate cooling air channels formed in the machine housing above the exciter poles for passing cooling air to the overhang turns located on the side of the armature opposite to the one on which the single blower is located.

In accordance with an additional feature of the invention, the main exciter machine has a shaft, and the device includes baffle means extending perpendicularly to the exciter machine shaft and radially outwardly to the separate cooling air channels located above the exciter poles for guiding cooling air to the cooling channels defined by the adjacent pairs of closely disposed coil rods in the region of the overhang turns.

In accordance with a concomitant feature of the invention, the exciter machine includes exciter poles located opposite the armature laminated core, and the pair of the coil rods are disposed in respective upper and lower layers of the overhang turns, the cooling channels defined by the adjacent pairs of closely disposed coil rods in the upper layer being separated from those in the lower layer, and radial channel means located in the region bordering the armature laminated core and communicating with the cooling channels in the upper and lower layers, whereby cooling air is guidable inwardly from an end of the overhang turns in separate flows through the cooling channels in the upper and lower layers and is dischargeable through the radial channel means in direction toward the exciter poles.

Although the invention is illustrated and described herein as embodied in device for cooling the overhang or end turns of the armature of polyphase A.-C. main machines it is nevertheless not intended to be limited to the details shown since various modifications and structural changes may be made therein without departing from the spirit of the invention and within the scope and range of equivalents of the claims.

The construction and method of operation of the invention however, together with additional objects and advantages thereof will be best understood from the following description of specific embodiments when read in connection with the accompanying drawings, in which.

Figure 1A:
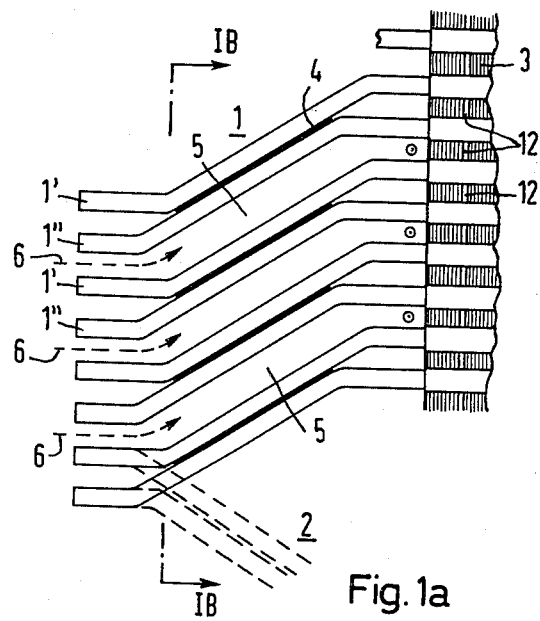
FIG. 1a is a diagrammatic view of several of the armature core bars of an exciter machine end or overhang turn region of the bars.

Referring now to the drawings and, first, particularly to FIG. 1a thereof, there are shown therein individual core bars 1 (seen in development) which extend, with uniform lateral spacing, from the armature laminated core 3. In accordance with the invention, in the region of the overhang or end turns, respective pairs of adjacent bars 1' and 1'' are moved so far together that they, at least along the angularly disposed or cranked part of the overhang or end turns, are located closely adjacent one another and separated only by a narrow intermediate layer 4. By moving together pairs of adjacent bars, channels 5 free of spacers are formed between respective pairs of substantially abutting bars 1' and 1'', the channels 5 being traversible by cooling air from the outside in the direction of the arrows 6.

Figure 1B:
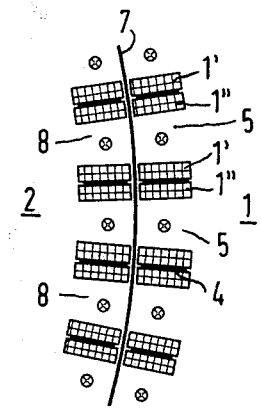
FIG. 1b is a sectional view of FIG. 1a taken along the line IB—IB in the direction of the arrows.

As shown in FIG. 1b, an intermediate layer 7 divides the overhang or end turns into an upper layer 1 and a lower layer 2 having separated channels 5 and channels 8, respectively.

Figure 2:
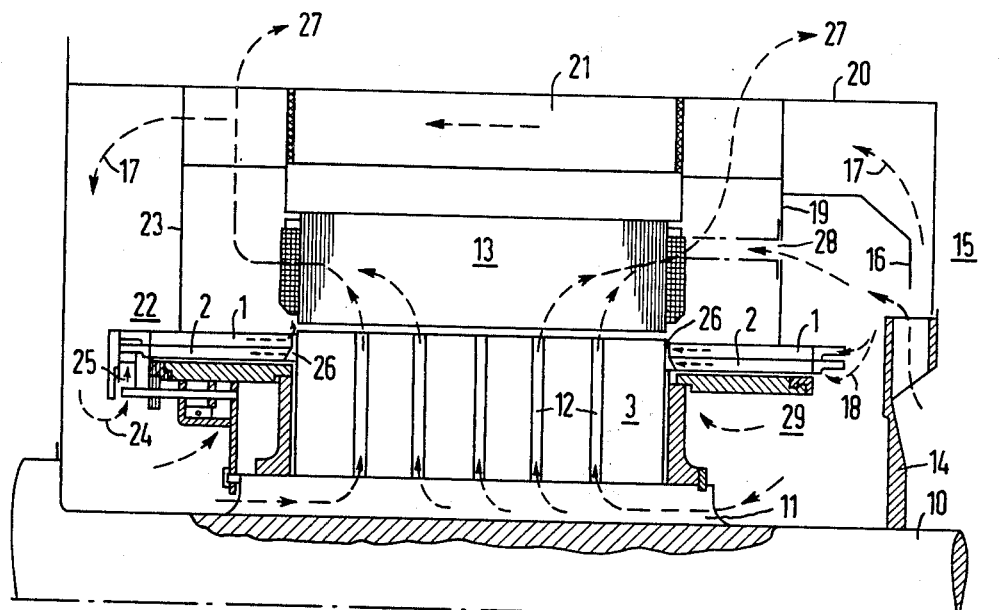
FIG. 2 is a longitudinal sectional view of the upper half of the main exciter machine provided with air cooling channels in accordance with the invention.

In the longitudinal sectional view of the upper half of a polyphase a-c main exciter machine illustrated in FIG. 2, the guidance or paths for the cooling air to the aforedescribed overhang or end turns is especially shown. The main exciter machine has a shaft 10 which is of star-shaped construction in the region of the armataure laminated core 3 in order to be provided with axially extending cooling channels 11, into and through which the cooling air flows and then leaves through radially extending channels 12 formed in the armature laminated core 3 in direction toward the poles of the exciter machine.

On one side of the exciter machine, on axial or radial fan or blower 14 is mounted which sucks the cooling air out of an adjacent space 15 which need not be further described for the purpose of the invention of the instant application. The cooling air is separated into two partial flows 17 and 18 by a baffle plate 16 which extends initially perpendicularly to the shaft 10 of the exciter machine above the middle of the blower outlet 14'. Due to another baffle plate 19 which extends perpendicularly to the machine shaft 10 as well as radially outwardly to the outer periphery of the end or overhang turns, the cooling air flow 18 is led radially inwardly in direction toward the machine shaft 10 and flows from there partially through the cooling channels 11 to the armature laminated core 3 and partially in axial direction from the front end i.e. at the right-hand side of FIG. 2, through the cooling channels 5 and 8 of the armature coil bars 1 and 2 of the overhang or end turns 29, on the side of the exciter machine facing the blower 14.

Additional axially extending overflow channels 21 are provided above the yoke of the exciter poles 13 and within the machine housing 20. The partial flow 17 of the cooling air can pass through the overflow channels 21 to the overhang or end turns 22 at the other side of the exciter machine i.e. at the left-hand side of FIG. 2. Since a baffle or guide wall 23 extends down to the forward end of the overhang or end turns 22 in a direction perpendicular to the machine shaft 10, the cooling air flow 17 is guided radially inwardly to below the overhang or end turns 22 and flows therefrom partly through the cooling channel 11 to the armature laminated core 3 and partly in direction of the arrow 24 through the junctions 25 of the overhang or end turns 22 first again radially outwardly and in axial direction through the cooling channels 5 and 8 located between the overhang or end turn rods 1 and 2. At the region of the rods 1 and 2 of the overhang or end turns 11 and 29 bordering the armature laminated core 3, radial channels 26 are provided through which the cooling air, which has been heated in the channels 5 and 8 provided in the overhang or end turns 22 and 29, discharges radially outwardly between the exciter poles 13 and then flows to the outside in direction of the arrows 27 together with the cooling air discharging from the channels 12 of the armature laminated core 3 through radial discharge channels intersecting the axial channels 21 but not visible in the sectional view of FIG. 2.

In addition still other passageway openings 28 are provided in the baffle 19 on the side of the blower 14. Part of the cooling air can pass through the openings 28 directly to the exciter poles 13 and cool the latter.

With the aforedescribed disposition of the rods 1 and 2 in the region of the overhang or end turns 22 and 29 of the polyphase a-c armature and the corresponding disposition of one or two blowers and additional cooling air channels, the currentproduced heat from the overhang or end turns can therewith be removed in a simple manner.

It is also possible, however, to provide a blower on every side of the exciter machine. In that case, the separate cooling air channels located above the exciter poles can be dispensed with.

I claim:

1. Device for cooling overhang turns of the armature of a polyphase a-c main exciter machine wherein the armature has a laminated core, comprising a plurality of coil rods extending from opposite sides of the armature laminated core, respective pairs of said rods being disposed close to one another in the region of the overhang turns, the coil rods of said respective pairs thereof being mutually spaced at substantially uniform lateral distance, adjacent pairs of said closely disposed coil rods defining cooling channels therebetween, and blower means for passing cooling air through said cooling channels on both said opposite sides of said armature, said pairs of coil rods being disposed in respective upper and lower layers of the overhang turns with an intermediate layer between the pairs of coil rods dividing the pairs of coil rods into said upper and lower layers with cooling channels defined by the adjacent pairs of closely disposed coil rods in the upper layer separated from cooling channels in the lower layer, said intermediate layer extending near to the region bordering the armature laminated core to provide radial channel means located in the region bordering the armature laminated core and communicating with the cooling channels in said upper and lower layers, whereby cooling air is guidable inwardly from an end of the overhang turns in separate flows through the cooling channels in said upper and lower layers and is dischargeable through said radial channel means in direction toward the exciter poles.

* * * * *